(12) United States Patent
Ogawa (10) Patent No.: US 7,563,014 B2
(45) Date of Patent: Jul. 21, 2009

(54) PLANAR LIGHT SOURCE DEVICE WITH HEAT SPREADER SHEET

(75) Inventor: Yuji Ogawa, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 183 days.

(21) Appl. No.: 11/545,485

(22) Filed: Oct. 11, 2006

(65) Prior Publication Data

US 2007/0091643 A1 Apr. 26, 2007

(30) Foreign Application Priority Data

Oct. 25, 2005 (JP) .............................. 2005-310059

(51) Int. Cl.
*F21V 7/04* (2006.01)
*G02F 1/1335* (2006.01)

(52) U.S. Cl. ........................ 362/628; 362/632; 362/218; 362/345; 362/294; 362/373; 349/67

(58) Field of Classification Search ................. 362/614, 362/624, 625, 627, 628, 632, 218, 345, 294, 362/373; 349/67
See application file for complete search history.

(56) References Cited

U.S. PATENT DOCUMENTS

| | | | | |
|---|---|---|---|---|
| 3,497,686 A | * | 2/1970 | Young | ........................ 362/623 |
| 5,667,289 A | * | 9/1997 | Akahane et al. | ............. 362/614 |
| 5,742,366 A | * | 4/1998 | Imoto | ........................... 349/62 |
| 5,808,708 A | * | 9/1998 | Oyama et al. | .................. 349/65 |
| 6,108,060 A | * | 8/2000 | Funamoto et al. | ............. 349/65 |
| 6,231,202 B1 | * | 5/2001 | Kozaka et al. | ............. 362/614 |
| 6,330,386 B1 | * | 12/2001 | Wagner et al. | ............. 362/614 |
| 2001/0036068 A1 | * | 11/2001 | Suzuki et al. | ................ 362/31 |
| 2002/0030985 A1 | * | 3/2002 | Ohkawa | ....................... 362/31 |
| 2004/0062030 A1 | * | 4/2004 | Yamada et al. | ................ 362/31 |
| 2005/0024846 A1 | * | 2/2005 | Yu et al. | ....................... 362/31 |
| 2006/0221638 A1 | * | 10/2006 | Chew et al. | .................. 362/623 |

FOREIGN PATENT DOCUMENTS

| | | |
|---|---|---|
| JP | 6-194650 | 7/1994 |
| JP | 9-318940 | 12/1997 |
| JP | 2000-241814 | 9/2000 |
| JP | 2001-311944 | 11/2001 |

\* cited by examiner

*Primary Examiner*—Ismael Negron
(74) *Attorney, Agent, or Firm*—Oblon, Spivak, McClelland, Maier & Neustadt, P.C.

(57) ABSTRACT

A backlight unit including a light guide plate, a linear light source disposed in the light incident side of the light guide plate, a reflective sheet disposed in the rear side of the light guide plate, and a heat spreader sheet disposed in the rear side of the reflective sheet. In this backlight unit, an edge of the heat spreader sheet is placed more inner than the light incident side surface of the light guide plate in the vicinity of an electrode portion of the linear light source. Furthermore another edge of the heat spreader sheet is substantially aligned with an corresponding side surface other than the incident side surface of the light guide plate.

12 Claims, 5 Drawing Sheets

PLANAR LIGHT SOURCE DEVICE WITH HEAT SPREADER SHEET

BACKGROUND OF THE INVENTION

1. Field of the Invention

The present invention relates to a planar light source device and a liquid crystal display apparatus using the same.

2. Description of Related Art

A typical liquid crystal display apparatus includes a liquid crystal display panel and a backlight unit disposed on the rear side of the panel. In this structure, heat generated by a linear light source such as a cold-cathode tube constituting the backlight unit is transferred to the liquid crystal display panel, causing nonuniform thermal distribution over the liquid crystal display panel, where uneven display is likely to occur.

One approach to overcome such drawback is to dispose a heat spreader sheet with high thermal conductivity such as aluminum on a rear surface or a side surface of a light guide plate or a linear light source constituting a backlight unit so as to uniformize the in-plane thermal distribution of a liquid crystal display panel. Such a technique is disclosed in Japanese Unexamined Patent Application Publication Nos. 09-318940 and 2001-311944, for example.

In such a structure, however, heat can be excessively deprived from a light emitting portion of the linear light source, particularly from an electrode portion. This causes the linear light source to have nonuniform thermal distribution and significantly shortens the life of the linear light source.

The present invention has been accomplished to solve the above drawbacks and an object of the present invention is thus to provide a planar light source device capable of suppressing the reduction in the life of the light source and a liquid crystal display apparatus using the same capable of suppressing the occurrence of uneven display due to heat emission by the light source.

SUMMARY OF THE INVENTION

According to an aspect of the present invention, there is provided a planar light source device including a light guide plate, a linear light source disposed in a light incident side of the light guide plate, a reflective sheet disposed in a rear side of the light guide plate, and a heat spreader sheet disposed in a rear side of the reflective sheet, wherein an edge of the heat spreader sheet is at an inner side relative to a light incident side surface of the light guide plate in vicinity of an electrode portion of the linear light source, and an another edge of the heat spreader sheet is substantially aligned with a corresponding side surface other than the incident side surface of the light guide plate.

This structure allows the linear light source to have substantially appropriate thermal distribution and suppresses the reduction in the life of the linear light source.

According to another aspect of the present invention, there is provided the above planar light source device in which the edge of the heat spreader sheet is at an inner side relative to the light incident side surface of the light guide plate in a range where the linear light source exists. This structure more effectively suppresses the reduction in the life of the linear light source.

According to another aspect of the present invention, there is provided the above planar light source device in which the edge of the heat spreader sheet, other than a positioning portion of the heat spreader sheet, is at an inner side relative to the light incident side surface of the light guide plate in a range where the linear light source exists. This structure enables accurate positioning of the heat spreader sheet.

According to another aspect of the present invention, there is provided the above planar light source device in which the linear light source comprises at least one bent portion. The present invention is applicable to such a case with equal effects.

According to another aspect of the present invention, there is provided a liquid crystal display apparatus including the planar light source device of any one of above and a liquid crystal display panel disposed in a viewing side of the planar light source device. This structure suppresses the reduction in the life of the linear light source and the occurrence of uneven display to realize high quality display.

The present invention provides a planar light source device capable of suppressing the reduction in the life of a light source and a liquid crystal display apparatus using the same capable of suppressing the occurrence of uneven display.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

Exemplary embodiments of the present invention are described hereinafter. The explanation provided hereinbelow merely illustrates the embodiments of the present invention, and the present invention is not limited to the below-described embodiments. The description hereinbelow and the accompanying drawings are appropriately shortened and simplified to clarify the explanation.

First Embodiment

Figure 1:
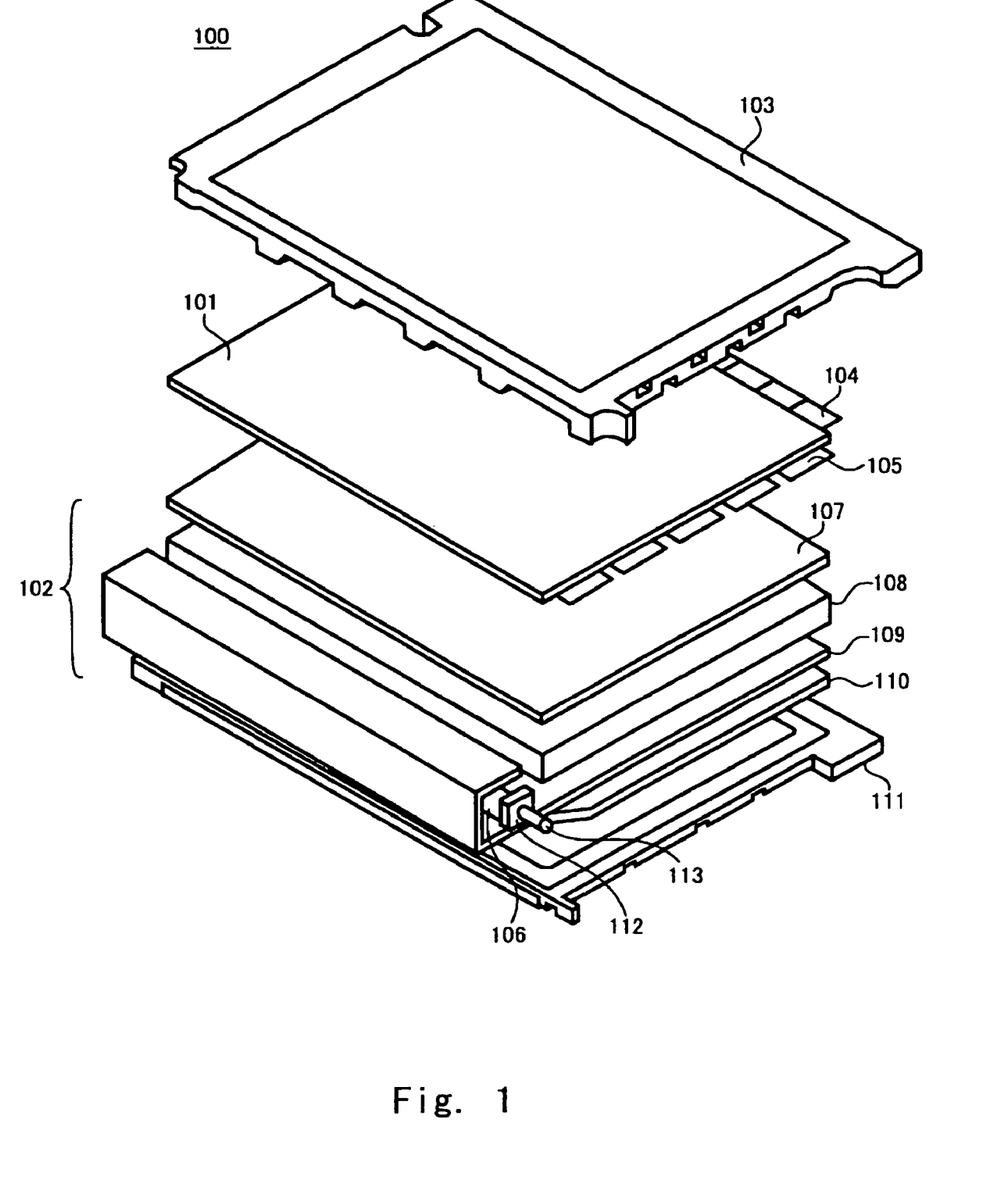
FIG. 1 is an exploded perspective view showing the structure of a liquid crystal display apparatus according to a first embodiment of the present invention.

Referring first to FIG. 1, a liquid crystal display apparatus according to an embodiment of the present invention is described hereinafter. FIG. 1 is an exploded perspective view showing an exemplary structure of a liquid crystal display apparatus 100 according to this embodiment. A liquid crystal display panel 101 of this embodiment is described as a TFT liquid crystal display panel. As shown in FIG. 1, the liquid crystal display apparatus 100 of this embodiment includes the liquid crystal display panel 101, a backlight unit 102, and an outer frame 103. The backlight unit 102 is located in the rear side of the liquid crystal display panel 101. The outer frame 103 is located in the front side of the liquid crystal display panel 101 so as to fix the liquid crystal display panel 101 and the backlight unit 102. The backlight unit 102 of this embodiment has a heat spreader sheet 110 in order to effectively conduct the heat generated by a linear light source 106 to suppress the occurrence of uneven display in the liquid crystal display panel 101. The shape and arrangement of the heat spreader sheet 110 are determined so as to enable the suppression of the reduction in the life of the linear light source 106 as detailed later.

In the liquid crystal display panel 101, liquid crystals are sealed between two substrates: a TFT (Thin Film Transistor) array substrate and a counter substrate placed face to face each other, which are both not shown. The TFT array substrate has horizontal gate lines (scan lines) and vertical source lines (signal lines). A TFT is formed at each crossing portion of the gate lines and the source lines. A pixel electrode is formed in each area surrounded by the gate lines and the source lines. The gate of the TFT is connected to the gate line, the source to the source line, and the drain to the pixel electrode.

A space between the TFT array substrate and the counter substrate is kept constant by a spacer. A polarizing plate is adhered to the respective outer surfaces of the TFT array substrate and the counter substrate. Formed on the counter substrate are a common electrode and an R(red)/G(green)/B (blue) color filter. The common electrode is a transparent electrode which is formed over a substantially whole area of the counter substrate to face the pixel electrodes.

The liquid crystal display panel 101 has a display area and a peripheral area. The display area is composed of a plurality of pixels. The peripheral area is formed to surround the display area. The peripheral area is connected with a source driver 104 and a gate driver 105. The source driver 104 and the gate driver 105 are connected to the TFT array substrate typically by TAB (Tape Automated Bonding). They may be directly connected onto the TFT array substrate by COG (Chip On Glass) instead.

The operation of the liquid crystal display panel 101 is described hereinbelow. Each gate line receives a scan signal from the gate driver 105. Each scan signal selects one gate line to simultaneously turn on all TFTs connected to the selected gate line. Each source line receives a gradation voltage in accordance with a display signal from the source driver 104 to accumulate a charge on the pixel electrode. In accordance with a voltage difference between the charged pixel electrode and the common electrode, the alignment of the liquid crystals between the pixel electrode and the common electrode is changed. The polarization direction of the linearly polarized light having passed through the polarizing plate on the reverse-viewing side is controlled by the liquid crystals, and the transmission of the light to pass the polarizing plate on the viewing side is thereby controlled. The pixels of the liquid crystal display panel 101 cause display of various colors by color tones depending on transmitted light intensity and R/G/B color representation. A color filter can be eliminated for monochromatic display.

Besides the TFT type, a passive matrix type is known as a liquid crystal display panel type. Also known are TN (Twisted Nematic), STN (Super Twisted Nematic), IPS (In-Plane Switching) where pixel electrodes and a common electrode are formed on the same substrate, and so on. The present invention is applicable to various types of liquid crystal display panels.

Figure 2:
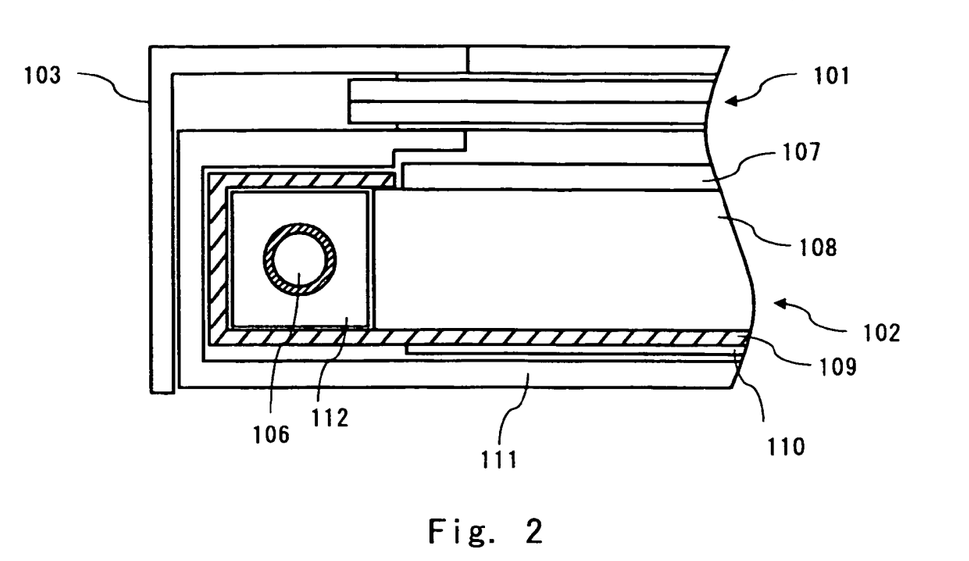
FIG. 2 is a cross-sectional view showing a part of the structure of the liquid crystal display apparatus according to the first embodiment of the present invention.
Figure 3:
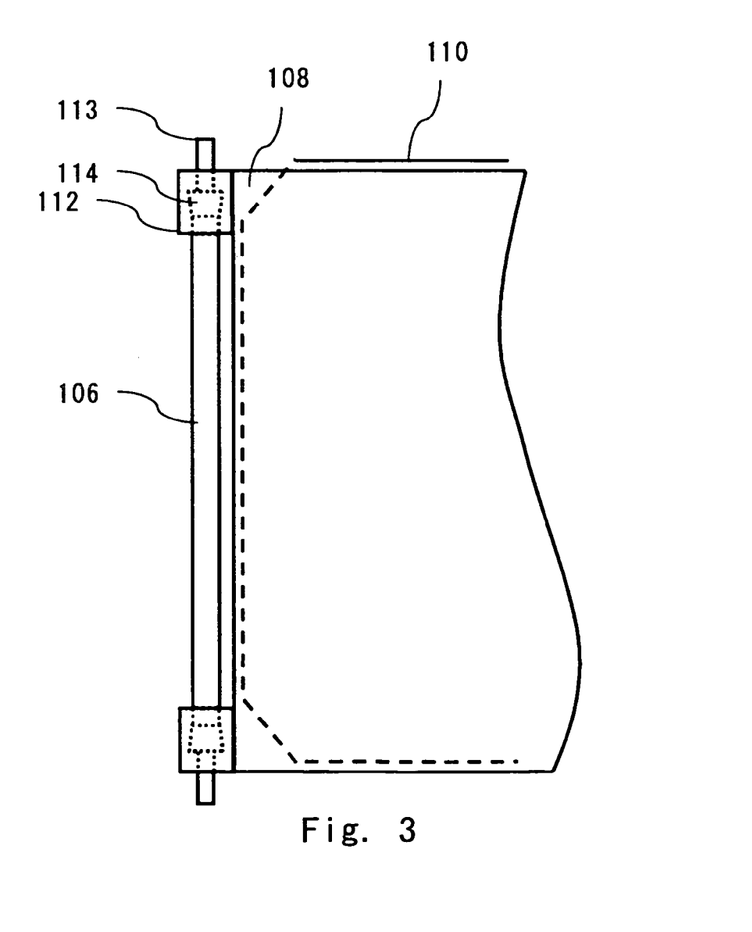
FIG. 3 is a front view showing a part of the structure of a backlight unit according to the first embodiment of the present invention.

Referring now to FIGS. 1 to 3, the structure of the backlight unit 102 is described hereinafter. FIG. 2 is a cross-sectional view showing a part of the structure of the liquid crystal display apparatus 100. FIG. 3 is a front view to describe the arrangement of some components of the liquid crystal display apparatus 100. In FIG. 3, only several components are illustrated to simplify the description. In FIGS. 1 to 3, the same elements are denoted by the same reference numerals.

The backlight unit 102 is a sidelight type, which emits planar light to the liquid crystal display panel 101. The backlight unit 102 includes the linear light source 106, an optical sheet 107, a light guide plate 108, a reflective sheet 109, the heat spreader sheet 110, and a frame 111. The optical sheet 107, the light guide plate 108 and the reflective sheet 109 are laminated in this order from the viewing side and contained in the frame 111.

The linear light source 106 lies along the light incident side surface of the light guide plate 108. A cold-cathode tube may be used for the linear light source 106. As shown in FIG. 3, an electrode portion 114 with a high voltage is disposed at each end of the linear light source 106. The electrode portion 114 is surrounded by a holder 112 which is formed of an insulating member such as a silicone rubber. A terminal 113 is connected to the electrode portion 114 in such a way that it projects from the holder 112. The terminal 113 is connected to an inverter circuit, though not shown. The linear light source 106 is thereby supplied with a voltage to emit light from a light emitting portion between the two electrode portions 114. The light emitted from the linear light source 106 enters the light guide plate 108 through the side surface thereof.

The light guide plate 108 guides the light from the linear light source 106 to diffuse it and emits planar light to the front side. The light guide plate 108 may have a dot pattern on the surface of the reverse-viewing side for effectively outputting the light from the linear light source 106 to the liquid crystal display panel 101. The dot pattern may be created by dot printing or processing. Alternatively, the light guide plate 108 may have an indented pattern on the rear surface. Diffusion treatment may be performed in the light guide plate 108 for better light emission distribution. As shown in FIGS. 1 and 2, the light guide plate 108 has a plate shape with a rectangular cross section. The cross section of the light guide plate 108 may be wedge-shaped or substantially wedge-shaped in accordance with the shape of the linear light source 106.

The optical sheet 107 is placed on the top surface of the light guide plate 108. The optical sheet 107 may be a lamination of sheets such as a diffusion sheet and a prism sheet, for example. The diffusion sheet uniformizes the light over the display surface. The diffusion sheet may be a conventional one such as a base sheet made of a synthetic resin with a patterned indented surface formed by embossing. The prism sheet collects light to enhance the front luminance. The prism sheet may be a base film such as polyethylene terephthalate with an indented pattern formed of an organic resin, for example.

The reflective sheet 109 allows the light output through the reverse-viewing side surface of the light guide plate 108 to re-enter the light guide plate 108. The reflective sheet 109 has a shape to surround the linear light source 106. The reflective sheet 109 thereby reflects the light emitted from the linear light source 106 in the direction different from the light guide plate 108 so as to allow those light to enter the light guide plate 108. In this embodiment, the reflective sheet 109 has an integrated shape which covers the rear surface of the light guide plate 108 and the rear, side, and top surfaces of the linear light source 106 as shown in FIGS. 1 and 2. Alternatively, the reflective sheet 109 may be divided into the part to cover the rear surface of the light guide plate 108 and the part to surround the three sides of the linear light source 106. The reflective sheet 109 may be a conventional one with a coating containing white pigment, with application of fine resin hollow powders, or the like. Instead, the reflective sheet 109 may be formed of a metal plate such as brass or aluminum. The reflective sheet 109 which is divided as above may be also formed of a metal plate.

The heat spreader sheet 110 made of a material with high thermal conductivity such as aluminum and a thermal conductive sheet is placed on the rear surface of the reflective sheet 109. The heat spreader sheet 110 effectively conducts the heat generated by the linear light source 106 to suppress the occurrence of uneven display in the liquid crystal display panel 101. The heat spreader sheet 110 can also suppress the reduction in the life of the linear light source 106 by its particular shape and arrangement as described later. The heat spreader sheet 110 is arranged substantially parallel with the rear surfaces of the reflective sheet 109 and the light guide plate 108.

Those components are held by the frame 111. The frame 111 may be formed of a sheet metal or resin and made up of a plurality of members. The frame 111 may further have such a structure as to hold and fix the liquid crystal display panel 101.

The optical operation of the backlight unit 102 is described below. The following description is directed to the case where the rear surface of the light guide plate 108 has a dot pattern. The light from the linear light source 106 enters the light guide plate 108 and transmits through the light guide plate 108 as totally reflected repeatedly. Part of the light which no longer satisfies the condition for the total reflection due to the dot pattern exits to the viewing side through the light exit surface of the light guide plate 108. Other part of the light exits through the reverse-viewing side surface of the light guide plate 108, is then reflected by the reflective sheet 109 and re-enters the light guide plate 108. The light exiting through the light exit surface of the light guide plate 108 is collected by the optical sheet 107 in the direction perpendicular to the display surface of the liquid crystal display panel 101 and then diffused. The backlight unit 102 can thereby output the planar light with uniform luminance to the liquid crystal display panel 101.

The liquid crystal display panel 101 and the backlight unit 102 are held together by the outer frame 103. The outer frame 103 may be formed of a sheet metal or resin and can also serve as a protection from external impact or a dressing member.

The heat spreader sheet 110 is detailed below. As shown in FIG. 3, an edge of the heat spreader sheet 110 is farther from the linear light source 106 in the vicinity of the electrode portions 114 compared with the light incident surface of the light guide plate 108. Specifically, the heat spreader sheet 110 has notches at the positions corresponding to the electrode portions 114 of the linear light source 106. In this embodiment, triangular corners of the heat spreader sheet 110 are cut away. The heat spreader sheet 110 is thereby apart from the electrode portion 114, which avoids that heat is excessively deprived from the electrode portion 114. This suppresses the reduction in the life of the linear light source 106.

Further, the heat spreader sheet 110 is placed more inner than the light incident side surface of the light guide plate 108 with respect to the light emitting portion between the electrode portions 114 at both ends of the linear light source 106. Therefore, the heat spreader sheet 110 is farther from the linear light source 106 compared with the light incident surface of the light guide plate 108 in the range where the linear light source 106 including the electrode portions 114 lies.

Such arrangement of the heat spreader sheet 110 prevents that too much heat is deprived from the linear light source 106. This suppresses the reduction in the life of the linear light source 106 and the reduction in the luminance of the linear light source 106. This consequently suppresses the occurrence of uneven display in the liquid crystal display panel 101 to realize high quality display.

Another edge of the heat spreader sheet 110 is aligned with the side surface of the light guide plate 108 opposite from the side along the linear light source 106. Thus, the length of the side of the heat spreader sheet 110 in the direction perpendicular to the elongated direction of the linear light source 106 is shorter than the corresponding side of the light guide plate 108. Further, the two side surfaces of the heat spreader sheet 110 which are perpendicular to the side surface along the linear light source 106 are substantially aligned with the respective side surfaces of the light guide plate 108. Accordingly, the three side surfaces of the heat spreader sheet 110 other than the side surface along the linear light source 106 are substantially aligned with the corresponding side surfaces of the light guide plate 108. This enables effective conduction of the heat generated by the linear light source 106. This consequently uniformizes the temperature distribution over the liquid crystal display panel 101 to thereby suppress the occurrence of uneven display.

As shown in FIG. 2, the reflective sheet 109 is placed between the light guide plate 108 and the heat spreader sheet 110. This prevents that the heat emitted by the linear light source 106 is directly transferred to the heat spreader sheet 110. This approximates the thermal distribution of the linear light source 106 used in this structure to the original thermal distribution of the linear light source 106 when used alone, thereby further suppressing the reduction in the life of the linear light source 106.

Second Embodiment

Figure 4:
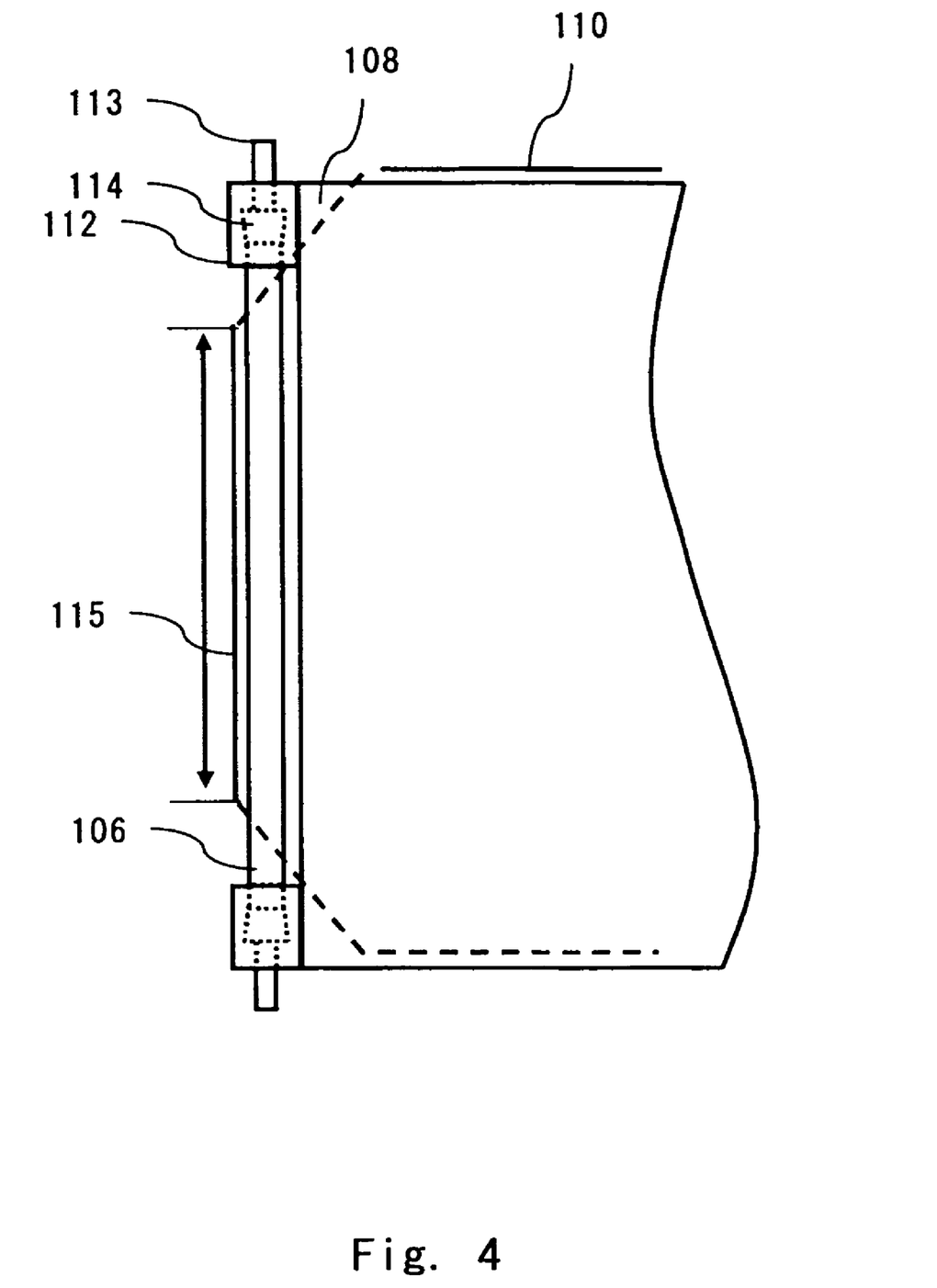
FIG. 4 is a front view showing a part of the structure of a backlight unit according to a second embodiment of the present invention.

A second embodiment of the present invention is described hereinafter with reference to FIG. 4. FIG. 4 is a front view to describe the arrangement of the components of the backlight unit 102 according to the second embodiment. Only several components are illustrated therein to simplify the description. In FIG. 4, the same elements as in FIGS. 1 to 3 are denoted by the same reference numerals, and redundant description is not provided herein.

In the first embodiment, the edge of the heat spreader sheet 110 is farther from the linear light source 106 compared with the light incident side surface of the light guide plate 108 in the whole part facing the linear light source 106 including the electrode portion 114. This structure reduces the heat spreading effect of the heat spreader sheet 110 to spread the heat emitted by the linear light source 106 and the heat generated by driving means such as the source driver 104 and the gate driver 105, which is the originally intended purpose. This can cause the insufficient suppression of display unevenness. The uneven display is likely to occur in the peripheral part of the liquid crystal display panel 101 due to insufficient heat spread, particularly at the middle of the sides of the panel.

In view of the foregoing, in this embodiment, the heat spreader sheet 110 is placed such that its edge is more inner than the light incident side surface of the light guide plate 108 to be away from the linear light source 106 over the range where the linear light source 106 exists, except for a positioning portion 115 of the heat spreader sheet 110 as shown in FIG. 4. The positioning portion 115 of the heat spreader sheet 110 lies outside the light incident side surface of the light guide plate 108. Specifically, the heat spreader sheet 110 has notches at the corners corresponding to the electrode portions 114 of the linear light source 106. Thus, in the vicinity of the electrode portions 114 of the linear light source 106, the length of the side of the heat spreader sheet 110 in the direction perpendicular to the elongated direction of the linear light source 106 is shorter than the corresponding side of the light guide plate 108. The heat spreader sheet 110 is therefore located so that the edge of the heat spreader sheet 110 is farther from the linear light source 106 in the vicinity of the electrode portions 114 compared with the light incident side surface of the light guide plate 108.

On the other hand, the heat spreader sheet 110 is placed closer to the linear light source 106 compared with the light incident side surface of the light guide plate 108 in the area corresponding to the light emitting portion between the electrode portions 114 of the linear light source 106. Specifically, in the area below the light emitting portion of the linear light source 106, the heat spreader sheet 110 lies outside the light incident side surface of the light guide plate 108. As shown in FIG. 4, the edge of the heat spreader sheet 110 extends to the left side of the linear light source 106 in this embodiment. Accordingly, in the vicinity of the light emitting portion of the linear light source 106, the length of the heat spreader sheet 110 in the direction perpendicular to the elongated direction of the linear light source 106 is longer than the corresponding length of the light guide plate 108.

Such a structure prevents that too much heat is deprived in the vicinity of the electrode portions 114 of the linear light source 106 to thereby suppress the reduction in the life of the linear light source 106. Further, it enables effective light spreading in the vicinity of the light emitting portion to thereby suppress the occurrence of uneven display in the liquid crystal display panel 101.

As described above, the reflective sheet 109 is placed between the light guide plate 108 and the heat spreader sheet 110. The reflective sheet 109 is further extended between the linear light source 106 and the heat spreader sheet 110. This prevents that the heat emitted by the linear light source 106 is directly transferred to the heat spreader sheet 110. Accordingly, it is not likely to excessively lower the temperature of the linear light source 106 even if the heat spreader sheet 110 extends below the linear light source 106. This enables the suppression of the reduction in the luminance of the linear light source 106 to realize high quality display.

If the length of the heat spreader sheet 110 is longer than the light guide plate 108 in the vicinity of the light emitting portion of the linear light source 106, the heat spreader sheet 110 is folded along the inner wall of the frame 111. The heat spreader sheet 110 is thereby up against the inner wall of the frame 111, which enables positioning of the heat spreader sheet 110. Thus, the extended part of the heat spreader sheet 110 corresponding to the light emitting portion of the linear light source 106 serves as the positioning portion 115.

In this embodiment, just like the first embodiment as described above, the three sides of the heat spreader sheet 110 other than the side along which the linear light source 106 is placed are substantially aligned with the corresponding sides of the light guide plate 108. This enables effective conduction of the heat generated by the linear light source 106. This consequently uniformizes the temperature distribution over the liquid crystal display panel 101 to thereby suppress the occurrence of uneven display.

Although the heat spreader sheet 110 extends below the light emitting portion of the linear light source 106 so that the positioning portion 115 of the heat spreader sheet 110 comes outside the linear light source 106 as shown in FIG. 4 in this embodiment, the present invention is not limited thereto. For example, the edge of the heat spreader sheet 110 may be substantially aliened with the light incident side surface of the light guide plate 108. In such a structure also, the heat spreader sheet 110 has notches at the positions corresponding to the electrode portions 114 of the linear light source 106.

Third Embodiment

Figure 5:
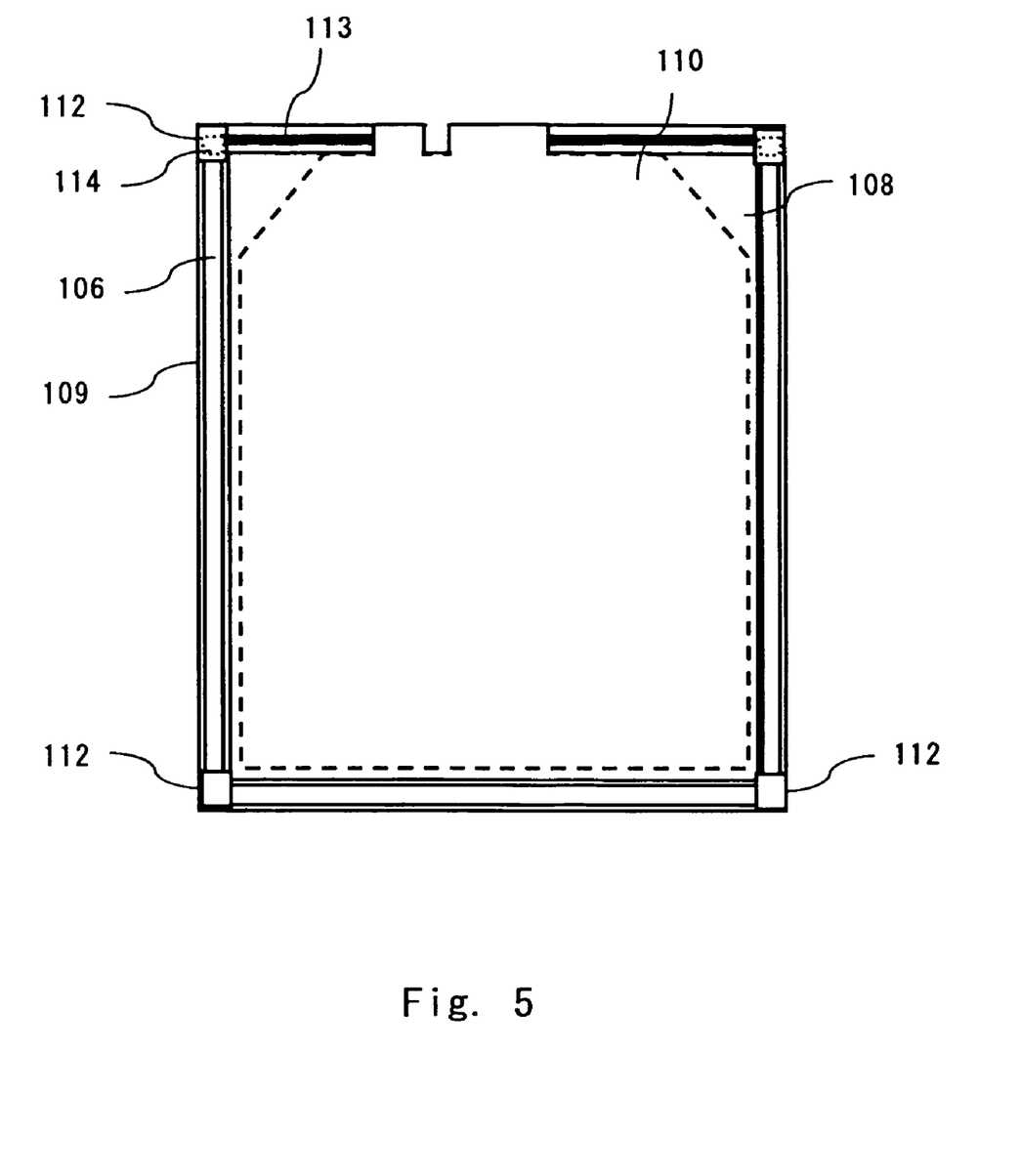
FIG. 5 is a front view showing a part of the structure of a backlight unit according to a third embodiment of the present invention.

A third embodiment of the present invention is described hereinafter with reference to FIG. 5. FIG. 5 is a front view to describe the arrangement of the components of the backlight unit 102 according to the third embodiment. Only several components are illustrated therein to simplify the description. In FIG. 5, the same elements as in FIGS. 1 to 3 are denoted by the same reference numerals, and redundant description is not provided herein.

In this embodiment, a cold-cathode tube on which at least one time of bending processing is performed is used as the linear light source 106. The linear light source 106 of this embodiment thus has at least one bent portion. In this embodiment, the linear light source 106 is a horseshoe-shaped cold-cathode tube having two bent points as a result of two times of bending processing as shown in FIG. 5. The shape of the linear light source 106 is not limited thereto, and it may have an L-shape with one bent point as a result of one time of bending processing. The electrode portion 114 is covered by the holder 112 for protection. The holder 112 also covers each bent portion of the linear light source 106 to thereby prevent the breakage of the linear light source 106.

As shown in FIG. 5, the electrode portions 114 are placed at both sides of the horseshoe-shaped linear light source 106. The heat spreader sheet 110 has notches at the corners corresponding to the electrode portions 114 of the linear light source 106. Accordingly, the edge of the heat spreader sheet 110 is farther from the linear light source 106 compared with the light incident side surface of the light guide plate 108 in the vicinity of the electrode portions 114 of the linear light source 106. This prevents that too much heat is deprived in the vicinity of the electrode portions 114 of the linear light source 106 to thereby suppress the reduction in the life of the linear light source 106.

The heat spreader sheet 110 is also farther from the linear light source 106 compared with the light incident side surface of the light guide plate 108 in the area of the light emitting portion between the electrode portions 114 of the linear light source 106. Thus, in this embodiment, the three sides of the heat spreader sheet 110 other than the upper side (cf. FIG. 5) along which the linear light source 106 is not placed are farther from the linear light source 106 compared with the light incident side surface of the light guide plate 108. The edges of the heat spreader sheet 110 are therefore farther from the linear light source 106 compared with the light incident side surface of the light guide plate 108 in the range where the linear light source 106 including the electrode portions 114 exists. In other words, the edges of the heat spreader sheet 110 are placed more inner than the light incident side surface of the light guide plate 108 in the range where the linear light source 106 including the electrode portions 114 lies.

In FIG. 5, the upper side where the linear light source 106 is not placed of the heat spreader sheet 110 is substantially aligned with the corresponding side of the light guide plate 108. Thus, the length of the heat spreader sheet 110 is shorter than that of the light guide plate 108 both vertically and horizontally in FIG. 5. Such arrangement of the heat spreader sheet 110 prevents that too much heat is deprived from the linear light source 106. This suppresses the reduction in the life of the linear light source 106 and the occurrence of uneven display in the liquid crystal display panel 101.

As described above, the reflective sheet 109 is placed between the light guide plate 108 and the heat spreader sheet 110. This prevents that the heat emitted by the linear light source 106 is directly transferred to the heat spreader sheet 110. This approximates the thermal distribution of the linear light source 106 used in this structure to the appropriate thermal distribution of the linear light source 106 when used alone, thereby further suppressing the reduction in the life of the linear light source 106.

In this embodiment, just like the second embodiment as described above, the edges of the heat spreader sheet 110, except for the positioning portion 115, may be placed farther from the linear light source 106 compared with the light incident side surface of the light guide plate 108 in the area where the linear light source 106 exists. In such a case, the reflective sheet 109 extends between the light guide plate 108 and linear light source 106, and the heat spreader sheet 110. This further suppresses the reduction in the life of the linear light source 106.

EXAMPLE

Figure 6:
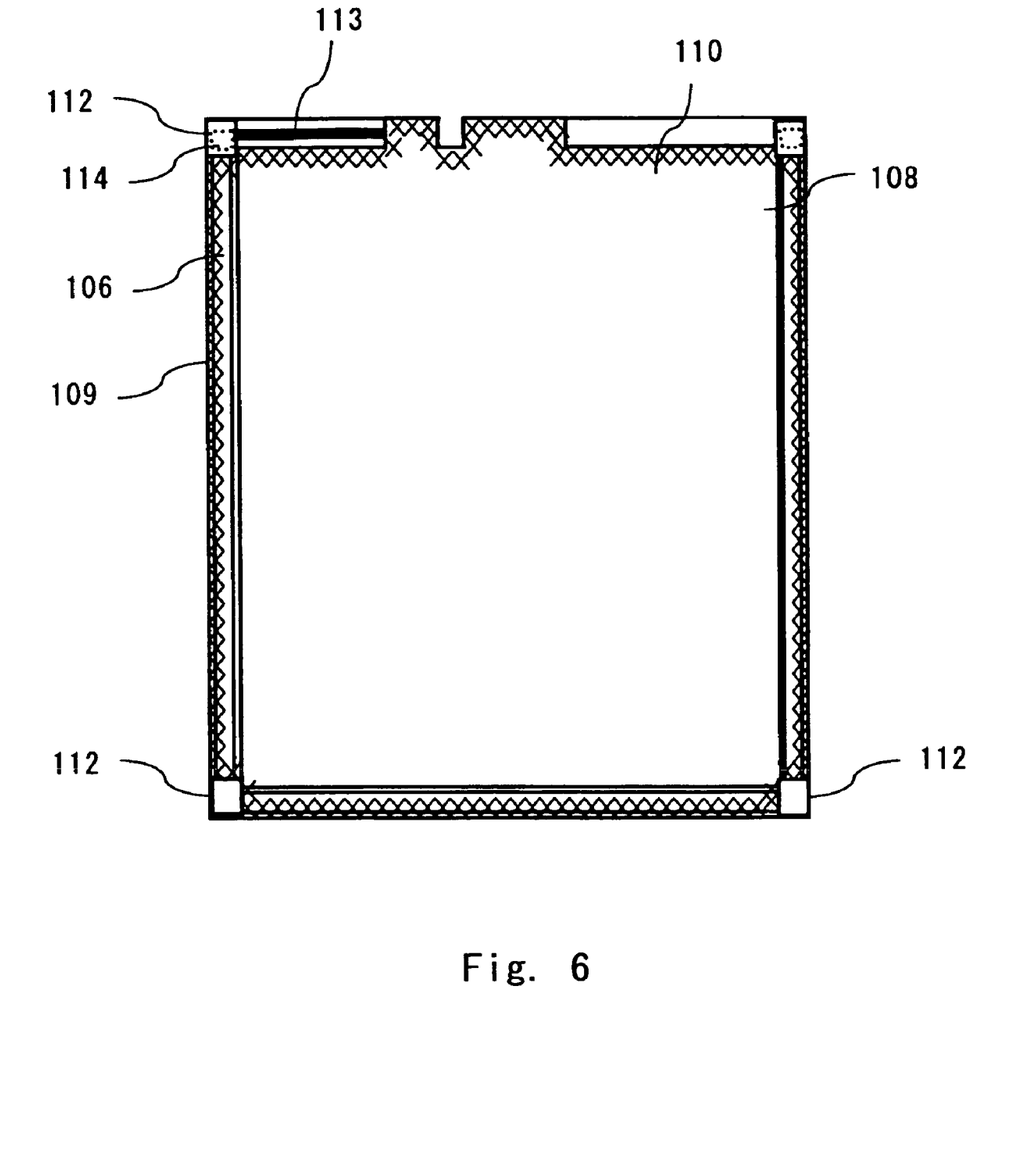
FIG. 6 is a front view showing a part of the structure of a backlight unit according to a related art.

For the liquid crystal display apparatus 100 which includes the heat spreader sheet 110 having the shape as shown in FIG. 5 and described in the third embodiment, the actual measurement of the bulb temperature of the electrode portion 114 and the light emitting portion apart from the electrode portions 114 and the observation of the life of the linear light source 106 and display unevenness were conducted. For comparison, the bulb temperature of the electrode portion 114 and the light emitting portion apart from the electrode portions 114 was actually measured and the life of the linear light source 106 and the display unevenness were compared for each of the linear light source 106 alone, the liquid crystal display apparatus which includes the heat spreader sheet 110 having a conventional shape as shown in FIG. 6, and the liquid crystal display apparatus which does not include the heat spreader sheet 110. The shape of the conventional heat spreader sheet 110 is such that it is defined by the crossed lines in FIG. 6. Specifically, the heat spreader sheet 110 extends to the rear side of the linear light source 106 in the light emitting area except for the electrode portions 114 and the bent portions.

Table 1 below shows the measurement results of the temperature, life, and display unevenness of the linear light source 106.

As is obvious from Table 1, when the heat spreader sheet 110 has the shape shown in FIG. 5, the bulb temperature approximated that of the linear light source 106 alone, and the life of the linear light source 106 was elongated while maintaining high display quality with low display unevenness.

As described in the foregoing, in the structure where the backlight unit 102 includes the heat spreader sheet 110 in order to prevent the uneven display due to the heat emitted by the linear light source 106, the edge of the heat spreader sheet 110 is placed farther from the linear light source 106 compared with each light incident side surface of the light guide plate 108 as described above. The edge of the heat spreader sheet 110 is placed well farther from the linear light source 106 compared with the light incident side surface of the light guide plate 108 particularly in the vicinity of the electrode portions 114. This approximates the thermal distribution to the appropriate distribution of the linear light source 106 alone while uniformizing the heat emitted by the linear light source 106, thereby elongating the life of the linear light source 106. It is thereby possible to provide the backlight unit 102 which realizes high display quality and has a long life and the liquid crystal display apparatus 100 using the same.

The application of the present invention is not limited to a backlight unit of a display apparatus. The present invention may be applied to other types of planar light source devices used for lighting.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A planar light source device comprising:
   a light guide plate;
   a linear light source disposed in a light incident side of the light guide plate;
   a reflective sheet disposed in a rear side of the light guide plate; and
   a heat spreader sheet disposed in a rear side of the reflective sheet,
   wherein along a first edge of the heat spreader sheet adjacent the linear light source, a distance between a first portion of the first edge and the linear light source is

TABLE 1

| | | ELECTRODE TEMPERATURE | TEMPERATURE DIFFERENCE | LIGHT EMITTING PORTION TEMPERATURE | TEMPERATURE DIFFERENCE | LIFE (Hr) | DISPLAY UNEVENNESS |
|---|---|---|---|---|---|---|---|
| | LINEAR LIGHT SOURCE ALONE | 119° C. | — | 60° C. | — | — | — |
| WITH BACKLIGHT | EMBODIMENT | 112° C. | 7° C. | 59° C. | 1° C. | 1.5 times (9K) | HIGH |
| | RELATED ART | 108° C. | 11° C. | 57° C. | 3° C. | 1 time (6K) | HIGH |
| | WITHOUT HEAT SPREADER SHEET | 116° C. | 3° C. | 60° C. | 0° C. | 2 times (12K) | LOW | different than a distance between a second portion of the first edge and the linear light source, wherein the first portion and the second portion are further away from the linear light source that is a light incident side surface of the light guide plate, and wherein, in a vicinity of an electrode portion of the linear light source, the first portion is further from the light incident side surface of the light guide plate than is the second portion, and an another edge of the heat spreader sheet is substantially aligned with a corresponding side surface other than the incident side surface of the light guide plate.

2. The planar light source device according to claim 1, wherein the linear light source comprises at least one bent portion.

3. The planar light source device according to claim 1, wherein the first edge of the heat spreader sheet is at an inner side relative to the light incident side surface of the light guide plate in a range where the linear light source exists.

4. The planar light source device according to claim 3, wherein the linear light source comprises at least one bent portion.

5. The planar light source device according to claim 1, wherein a positioning portion of the first edge of the heat spreader sheet is at an outer side relative to the light incident side surface of the light guide plate in a range between electrode portions of the linear light source.

6. The planar light source device according to claim 5, wherein the linear light source comprises at least one bent portion.

7. A liquid crystal display apparatus comprising:
the planar light source device as defined in claim 1; and
a liquid crystal display panel disposed in a viewing side of the planar light source device.

8. The liquid crystal display apparatus according to claim 7, wherein the linear light source comprises at least one bent portion.

9. The liquid crystal display apparatus according to claim 7, wherein the first edge of the heat spreader sheet is at an inner side relative to the light incident side surface of the light guide plate in a range where the linear light source exists.

10. The liquid crystal display apparatus according to claim 9, wherein the linear light source comprises at least one bent portion.

11. The liquid crystal display apparatus according to claim 7,
wherein a positioning portion of the first edge of the heat spreader sheet is at an outer side relative to the light incident side surface of the light guide plate in a range between electrode portions of the linear light source.

12. The liquid crystal display apparatus according to claim 11, wherein the linear light source comprises at least one bent portion.

* * * * *